Sept. 3, 1957  A. KREIDLER  2,804,956
RATCHET OR FREE WHEEL DEVICES
Filed April 27, 1954

INVENTOR
ALFRED KREIDLER
BY
ATTORNEY

United States Patent Office 2,804,956
Patented Sept. 3, 1957

2,804,956
RATCHET OR FREE WHEEL DEVICES
Alfred Kreidler, Stuttgart, Germany Application April 27, 1954, Serial No. 425,950

7 Claims. (Cl. 192—45)

The present invention concerns ratchet or free wheel devices.

Ratchets or free wheel devices are known in many constructions. They are advantageously used for transmitting a torque from a driving member to a driven member in one direction of rotation, whilst, in the opposite direction of rotation, they allow the members to free-wheel relative to one another. Such ratchets have, as is known, displaceable engaging members, such as catches or clamping members, and fixed engaging members such as star wheels or clamp cams. The fixed engaging members were hitherto usually manufactured together with the member supporting or driving them or the driven member, from one piece. This wasted a good deal of time, increased the risk of waste of material and required a special choice of material. Therefore, such manufacture was very expensive.

Consequently, it was an obvious matter to think of combining a separate ring provided with the fixed engaging members, such as star wheels or clamp cams, with the appropriate driving or driven member, by pinch fit or even by groove and spring. But, apart from the fact that both members may be manufactured from the material corresponding in each case with their function, nothing else of any consequence is obtained as, in order to achieve an adequate pinch or to have sufficient room for the groove, the ring must be constructed with a corresponding degree of thickness. This leads to difficulties of space and the fitting surfaces on the ring and its supporting member must also be constructed particularly carefully that is to say must be ground with great accuracy at least. However, greater or lesser radial force components—depending on the type of construction—are always produced in such ratchets upon the engagement thereof. This applies to catch ratchets, but particularly to the clamp ratchets.

It is, therefore, one object of the present invention to utilize these forces in a progressive manner in order to overcome the above described inadequacies.

It is another object of the present invention to mount the fixed engaging members on an elastic ring which is coupled to its supporting member with a friction lock due to the radial forces occurring in the ratchet, whereby it is advisable for the engaging ring to be cut with a substantially radial slot for achieving adequate elasticity, and in order to give sufficient purchase on its supporting member in the resting position without special holding members, it preferably has a sufficient degree of its own elasticity so that it is secured in itself thereby on its bearing member.

It is still another embodiment of the present invention to employ the present device particularly in such manner that a ring supporting the fixed engagement members on its outer surface is disposed with its cylindrical inner surface on its bearing part, namely a pin or a shaft; however, it may be conceived that a ring supporting the fixed engaging members on its inner side is received, in a bore in its carrying member, preferably a toothed wheel, by its cylindrical outer surface.

Hitherto, the catches or clamp cams were not usually provided on the inside of the outer free wheel or ratchet member as the latter broke too easily owing to the occurrence of the notch effect. Thus, it is yet another object of the present invention to provide, on the other hand, the supporting member with a closed inner cylindrical surface so that, even with a comparatively weak construction, it is able to receive fairly substantial forces without danger.

With these and other objects in view, which will become apparent in the following detailed description, the present invention will be clearly understood in connection with the accompanying drawing, in which.

Figure 1:
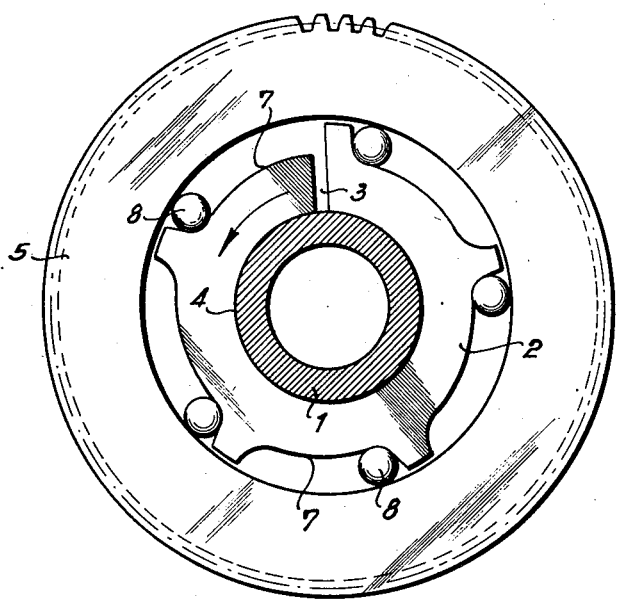
Figure 1 is a side elevation partly in section showing a free wheel device.

In the first example of construction a cam ring 2 having a radial slot 3 is disposed on a shaft 1 and is secured to the cylindrical outer surface 4 of the shaft 1 by its resilient contractile tendency or self-tension. The whole is enclosed by an annular toothed wheel 5. Locking rollers 8 are mounted between the cylindrical inner surface 6 of the toothed wheel 5 and cams 7 formed on the periphery of the ring 2.

The cams 7 rise radially outwards in the circumferential direction opposite to that of the arrow, as shown. The toothed wheel 5 can thus run freely in the direction of the arrow relative to the stationary shaft 1, the locking rollers adopting the position as shown. At the same time the self-tension of the cam ring 2 is sufficient to secure it against being rotated on the stationary shaft 1.

If, however, the shaft is driven in the direction of the arrow—first with the toothed wheel 5 stationary or running more slowly—the locking rollers 8 move outwards on the cams 7 and become securely wedged between the ring 2 and the toothed wheel 5 in such manner that the latter is engaged. The radial forces produced at the same time on the resilient cam ring 2 reinforce the friction lock between the shaft 1 and this ring to such an extent that these parts remain securely connected together.

Figure 2:
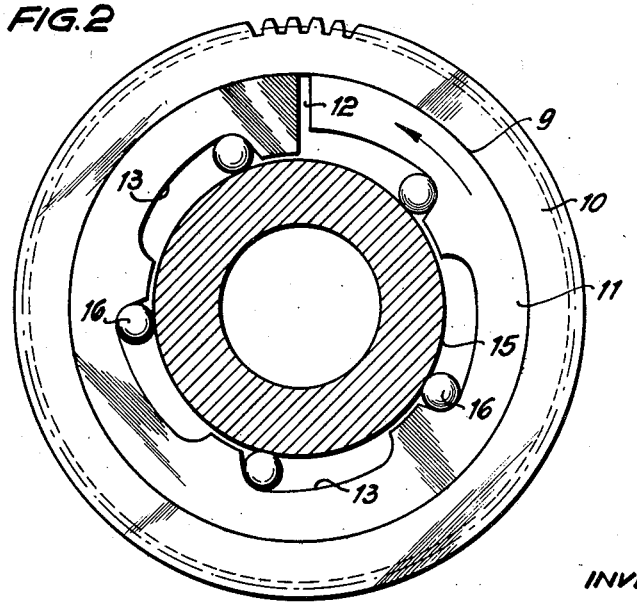
Fig. 2 is a similar view of another free wheel device.

In the example shown in Fig. 2 a cam ring 11 is inserted by its outer surface which is also cylindrical in a cylindrical bore 9 of a toothed wheel 10. This ring 11 is radially slotted at 12 and has an expansive tendency or outwardly acting self-tension causing it to press on the wall of the bore 9 so that it can not twist relative to the toothed wheel 10 when in the stationary position. Cams 13 are formed on the inside of the ring. The driving shaft 14 is disposed inside the ring 11. Locking rollers 16 are disposed in the hollow spaces between the cylindrical outer surface 15 of the driving shaft 14 and the cams 13.

Here again the toothed wheel 10 may run freely in the direction of the arrow relative to the driving shaft 14, the cam ring 13 being engaged owing to the friction lock obtained by its self-tension. In the reverse case, however, the shaft 14 is able in its turn to engage the toothed wheel 10 in the direction of the arrow by means of the locking rollers 16 and the cams 13. At the same time the locking rollers 16 exert such strong pressure outwardly on the ring 11 that it is connected to the toothed wheel all the more securely by the friction lock.

In both examples the toothed wheel may, of course, also be the driving member and the shaft the driven member. The direction of the arrow is then read as being in the opposite direction.

It may be seen how the friction lock increases in each case between the cam ring on the one hand and the driving or driven member on the other hand with the increasing load, so that, in spite of its simplicity, the connection in each case suffices for the torque to be transmitted. It will of course be understood that the pitch of the cams must be proportioned accordingly. This, however, is a matter of simple calculation or experiment.

While I have disclosed two embodiments of the present invention, it is to be understood that these embodiments are given by example only and not in a limiting sense, the scope of the present invention being determined by the objects and the claims.

I claim:

1. In a unidirectional torque transmitting arrangement, a first member presenting an externally cylindrical surface, a second member presenting an internally cylindrical surface of larger diameter than that of the said externally cylindrical surface, an integral intermediate generally annular resilient member surrounding said externally cylindrical surface of said first member and being surrounded by said internally cylindrical surface of said second member and fitting complementarily to one of said cylindrical surfaces, said intermediate member having an interruption extending from its internal periphery to its external periphery and presenting a plurality of arcuately extending recesses of tapering radial depth at spaced intervals around one of its peripheries, and a wedgeable locking element shaped as a body of rotation in each of said recesses, the dimensions of the parts being such that in the driving relative direction wedging action of said locking elements obtains between said intermediate member and said member presenting a cylindrical surface in contact with said elements, said wedging action resiliently deforming said intermediate member and urging the latter into secure driving engagement with said other member.

2. In a unidirectional torque transmitting arrangement, a first member presenting an externally cylindrical surface, a second member presenting an internally cylindrical surface of larger diameter than that of the said externally cylindrical surface, an integral intermediate generally annular resilient member surrounding said externally cylindrical surface of said first member and being surrounded by said internally cylindrical surface of said second member and fitting complementarily to said external cylindrical surface, said intermediate member having an interruption extending from its internal periphery to its external periphery and presenting a plurality of arcuately extending recesses of tapering radial depth at spaced intervals around its external periphery, and a wedgeable locking element shaped as a body of rotation in each of said recesses, the dimensions of the parts being such that in the driving relative direction wedging action of said locking elements obtains between said intermediate member and said second member, said wedging action resiliently deforming said intermediate member and urging the latter into secure driving engagement with said first member.

3. In a unidirectional torque transmitting arrangement, a first member presenting an externally cylindrical surface, a second member presenting an internally cylindrical surface of larger diameter than that of the said externally cylindrical surface, an intermediate generally annular resilient member surrounding said externally cylindrical surface of said first member and being surrounded by said internally cylindrical surface of said second member and fitting complementarily to said internal cylindrical surface, said intermediate member having an interruption extending from its internal periphery to its external periphery and presenting a plurality of arcuately extending recesses of tapering radial depth at spaced intervals around its internal periphery, and a wedgeable locking element shaped as a body of rotation in each of said recesses, the dimensions of the parts being such that in the driving relative direction wedging action of said locking elements obtains between said intermediate member and said first member, said wedging action resiliently deforming said intermediate member and urging the latter into secure driving engagement with said second member.

4. In a unidirectional torque transmitting arrangement, a first member presenting an externally cylindrical surface, a second member presenting an internally cylindrical surface of larger diameter than that of the said externally cylindrical surface, an integral intermediate generally annular resilient member surrounding said externally cylindrical surface of said first member and being surrounded by said internally cylindrical surface of said second member and fitting complementarily to one of said cylindrical surfaces, said intermediate member having an interruption extending from its internal periphery to its external periphery and presenting a plurality of arcuately extending recesses containing radially tapering cam surfaces and being disposed at spaced intervals around one of its peripheries, a roller in each of said recesses, the dimensions of the parts being such that in the driving relative direction wedging action of said rollers obtains between said intermediate member and said member presenting a cylindrical surface in contact with said rollers, said wedging action also tending resiliently to deform said intermediate member so as to urge the latter into secure driving engagement with said other member.

5. In a unidirectional torque transmitting arrangement, a first member presenting an externally cylindrical surface, a second member presenting an internally cylindrical surface of larger diameter than that of the said externally cylindrical surface, an integral intermediate generally annular resilient member surrounding said externally cylindrical surface of said first member and being surrounded by said internally cylindrical surface of said second member and fitting complementarily to one of said cylindrical surfaces, said intermediate member being resiliently deformable to tighten said complementary fitting as a result of radially acting force being applied thereto and presenting a plurality of arcuately extending recesses of tapering radial depth at spaced intervals around one of its peripheries, a wedgeable locking element shaped as a body of rotation in each of said recesses, the dimensions of the parts being such that in the driving relative direction wedging action of said locking elements obtains between said intermediate member and said member presenting a cylindrical surface in contact with said elements, said wedging action resiliently deforming said intermediate member and urging the latter into secure driving engagement with said other member.

6. A structure, as set forth in claim 2, in which said intermediate member has an inherent contractile tendency causing the latter to be engaged on the external cylindrical surface of said first member with some frictional effect even in the absence of wedging action of the said elements.

7. A structure, as set forth in claim 3, in which said intermediate members has an inherent expansive tendency causing the latter to be engaged on the internal cylindrical surface of said second member with some frictional effect even in the absence of wedging action of the said elements.

References Cited in the file of this patent

UNITED STATES PATENTS

| 838,024 | Hendricks | Dec. 11, 1906 |
| 1,893,231 | Floyd | Jan. 3, 1933 |
| 2,335,848 | Dodwell | Dec. 7, 1943 |
| 2,562,466 | Kesterton | July 31, 1951 |
| 2,603,496 | Richert | July 15, 1952 |

FOREIGN PATENTS

| 1,052,962 | France | Sept. 30, 1955 |